United States Patent
Camp et al.

(10) Patent No.: US 10,540,231 B2
(45) Date of Patent: Jan. 21, 2020

(54) LOG-STRUCTURED ARRAY (LSA) PARTIAL PARITY EVICTION AND REASSEMBLY

(71) Applicant: INTERNATIONAL BUSINESS MACHINES CORPORATION, Armonk, NY (US)

(72) Inventors: Charles Camp, Sugar Land, TX (US); Ioannis Koltsidas, Zurich (CH); Christopher Dennett, Houston, TX (US); Andrew D. Walls, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 15/944,981

(22) Filed: Apr. 4, 2018

(65) Prior Publication Data

US 2019/0310915 A1    Oct. 10, 2019

(51) Int. Cl.
*G06F 11/10* (2006.01)
*G06F 3/06* (2006.01)

(52) U.S. Cl.
CPC ........ *G06F 11/1088* (2013.01); *G06F 3/0619* (2013.01); *G06F 3/0644* (2013.01); *G06F 3/0689* (2013.01); *G06F 11/1096* (2013.01)

(58) Field of Classification Search
CPC ............. G06F 11/1088; G06F 11/1096; G06F 3/0619; G06F 3/0644; G06F 3/0689
See application file for complete search history.

(56) References Cited

U.S. PATENT DOCUMENTS

| 5,537,534 A | 7/1996 | Voigt et al. |
|---|---|---|
| 5,860,090 A | 1/1999 | Clark |
| 7,496,785 B2 | 2/2009 | Elliot et al. |
| 9,110,835 B1 | 8/2015 | Call et al. |

(Continued)

FOREIGN PATENT DOCUMENTS

| WO | 2007012920 A1 | 2/2007 | |
|---|---|---|---|
| WO | WO 2007/012920 A1 * | 2/2007 | .......... G06F 11/1088 |

OTHER PUBLICATIONS

Zhang et al., Rethinking RAID-5 data layout for better scalability, IEEE< Trans. on computer, vol. 63, No. 11, pp. 2816-2828. (Year: 2014).*

(Continued)

*Primary Examiner* — Shelly A Chase
(74) *Attorney, Agent, or Firm* — Griffiths & Seaton PLLC

(57) ABSTRACT

Embodiments for optimizing resource consumption through partial parity information eviction in a storage system of a data storage environment. One or more cooperative Redundant Array of Independent Disks (RAID) parity computations are performed by evicting partial parity data from a RAID controller memory to a storage entity prior to a full stripes worth of data being monotonically written to the storage entity. The storage entity assembles the partial parity data from the one or more cooperative RAID parity computations into a single parity computation valid for the full stripes worth of data, thereby offloading parity computation to the storage entity to more efficiently utilize the RAID controller memory resources.

21 Claims, 14 Drawing Sheets

(56) References Cited

U.S. PATENT DOCUMENTS

2013/0185488 A1* 7/2013 Talagala .............. G06F 12/0246
                                                    711/103
2016/0246537 A1   8/2016 Kim
2017/0123921 A1   5/2017 Ptak et al.

OTHER PUBLICATIONS

Krioukov et al., Parity lost and parity regained, Proceedings of the 6th USENIX conference on file and storage technologies, Article No. 9, ACM digital Library, pp. 1 to 15. (Year: 2008).*

* cited by examiner

LOG-STRUCTURED ARRAY (LSA) PARTIAL PARITY EVICTION AND REASSEMBLY

BACKGROUND OF THE INVENTION

Field of the Invention

The present invention relates in general to computing systems, and more particularly to, various embodiments for optimizing resource consumption within a data storage environment.

Description of the Related Art

In today's society, computer systems are commonplace. Computer systems may be found in the workplace, at home, or at school. Computer systems may include data storage systems, or disk storage systems, to process and store data. A storage system may include one or more disk drives, which may be configured in an array, such as a Redundant Array of Independent Disks (RAID) topology. In a RAID system, data is stored redundantly across multiple disks in a variety of configurations to provide data security in the event of a hardware or software failure.

As the technology field grows exponentially each year and ever-growing amounts of critical data are stored on storage systems such as RAIDs, the need to preserve and protect such data becomes increasingly paramount. Consequently, the need for advancement in the data storage field is of great precedence.

SUMMARY OF THE INVENTION

Various embodiments for optimizing resource consumption through partial parity information eviction in a storage system of a data storage environment are provided. In one embodiment, one or more cooperative Redundant Array of Independent Disks (RAID) parity computations are performed by evicting partial parity data from a RAID controller memory to a storage entity prior to a full stripes worth of data being monotonically written to the storage entity. The storage entity assembles the partial parity data from the one or more cooperative RAID parity computations into a single parity computation valid for the full stripe of data, thereby offloading parity computation to the storage entity to more efficiently utilize the RAID controller memory resources.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
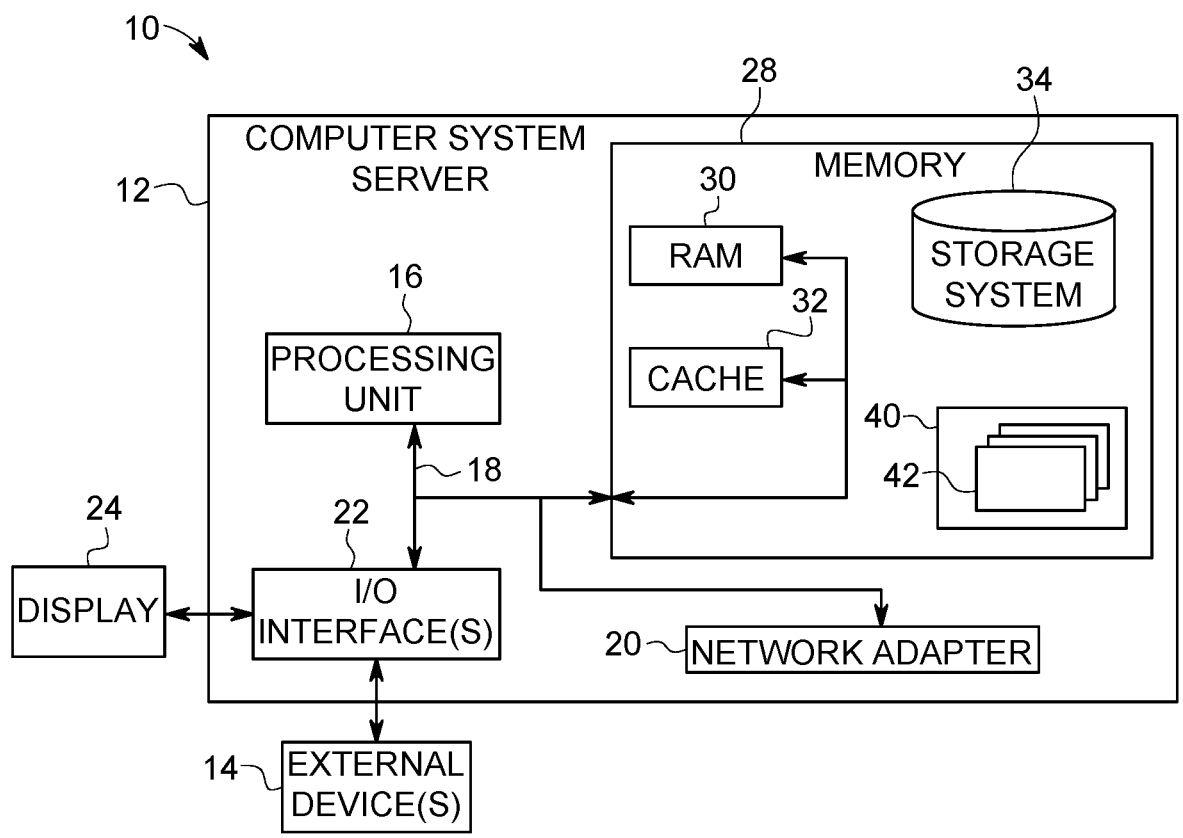
FIG. 1 is a block diagram depicting an exemplary cloud computing node according to an embodiment of the present invention.

In modern data processing systems, large amounts of stored data are processed daily and the current trend suggests that these amounts will continue to become ever-increasing for the foreseeable future. As the performance of microprocessor and semiconductor memory technology increases, many computing systems use a Redundant Array of Independent Disks (RAID) to significantly improve data transfer and Input/Output (I/O) rates over a comparable single disk access, but also to provide error correction, redundancy, and a lower cost storage solution.

RAID systems are disk array storage systems designed to provide large amounts of data storage capacity, data redundancy for reliability, and fast access to stored data. RAID storage uses multiple disks in order to provide fault tolerance, to improve overall performance, and to increase storage capacity in a system. With RAID technology, data can be mirrored on one or more other disks in the same array, such that if one disk fails, the data is preserved. RAID provides data redundancy to recover data from a failed disk drive and thereby improve reliability of the array. Although the disk array includes a multiplicity of disks, to the user the disk array is mapped by RAID management techniques within the storage subsystem to appear as one large, fast, reliable disk. There are several different methods to implement RAID.

RAID devices use many different architectures, depending on the desired balance between performance and fault tolerance. These architectures are called "levels." Standard RAID levels include the following: Level 0 (striped disk array without fault tolerance), Level 1 (mirroring and duplexing), Level 2 (error-correction coding), Level 3 (bit-interleaved parity), Level 4 (dedicated parity drive), Level 5 (block interleaved distributed parity), Level 6 (independent data disks with double parity) and Level 10 (a stripe of mirrors). Some devices use more than one level in a hybrid or nested arrangement, and some vendors also offer non-standard proprietary RAID levels. RAID level 1 mirrors the stored data on two or more disks to assure reliable recovery of the data. RAID levels 3, 4, and 5 distribute data across the disks in the array and provide for a block (or multiple blocks) of redundancy information (e.g., parity) that is also distributed over the disk drives. On each disk, data is mapped and stored in predefined blocks generally having fixed size. A predefined number of blocks of data and redundancy information (e.g., parity), from each disk of the array, are mapped to define a stripe of data. One type of stripe, the parallel stripe, provides load balancing across the disks in the array by defining the stripe as parallel blocks of data across the disk array. It should be noted that parity refers to the evenness or oddness of the number of bits within a given set of bits, and is thus determined by the value of all the bits. Parity can be calculated via an XOR sum of the bits, yielding 0 for even parity and 1 for odd parity. This property of being dependent upon all the bits and changing value if any one bit changes allows for its use in error detection schemes. Parity data may be used by some RAID levels to achieve redundancy. If a drive in the array fails, remaining data on the other drives can be combined with the parity data (using the Boolean XOR function) to reconstruct the missing data.

The present disclosure provides improved methods of dealing with this parity data as it is handled by a RAID controller buffer memory and the underlying storage entities storing the data across a stripe. The mechanisms herein are described within the context of high-performance storage systems that are connected to multiple servers over a high-performance fabric (e.g., NVM Express or NVMe), and it is assumed that servers connected to the considered storage system implement a log-structured array (LSA) above the storage system and always fills RAID stripes sequentially (i.e., any given RAID stripe will be written to in-order from the beginning of the stripe until its end). Further, in order to achieve maximum performance, the storage system may offload parity/RAID computations from the attached servers thereto and instead implement RAID functionality internally, and the system may also provide other features than those described in the present disclosure, such as compression and encryption mechanisms, as one skilled in the art would appreciate.

Generally, the present disclosure defines a mechanism by which two or more storage entities share the burden of parity calculation in a highly efficient manner. In various embodiments described herein, one or more storage entities performs "partial" RAID parity calculations, which may be offloaded to the other storage entities for reassembly into the complete parity content for a given RAID stripe, as will be further described. It should be appreciated that a storage entity may comprise the storage system itself or any portion thereof, such as a hard disk drive, a solid state drive (SSD), magnetic tape media, etc. Further, the storage entity may comprise a storage controller such as a RAID controller or any portion thereof, such as buffered memory, non-volatile memory, etc. Indeed, the "storage entity" is used herein merely for brevity and one skilled in the art would recognize that the storage entity may comprise a multiplicity of storage system or server resources (or portions thereof) used for performing the mechanisms presented herein. These mechanisms, for example, provide the benefit of reducing reliance on the RAID controller thereby allowing the memory and computational resources of the RAID controller to be freed for performing other tasks so as to more fully (and efficiently) utilize the resources thereof so that the resources do not become stagnant.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
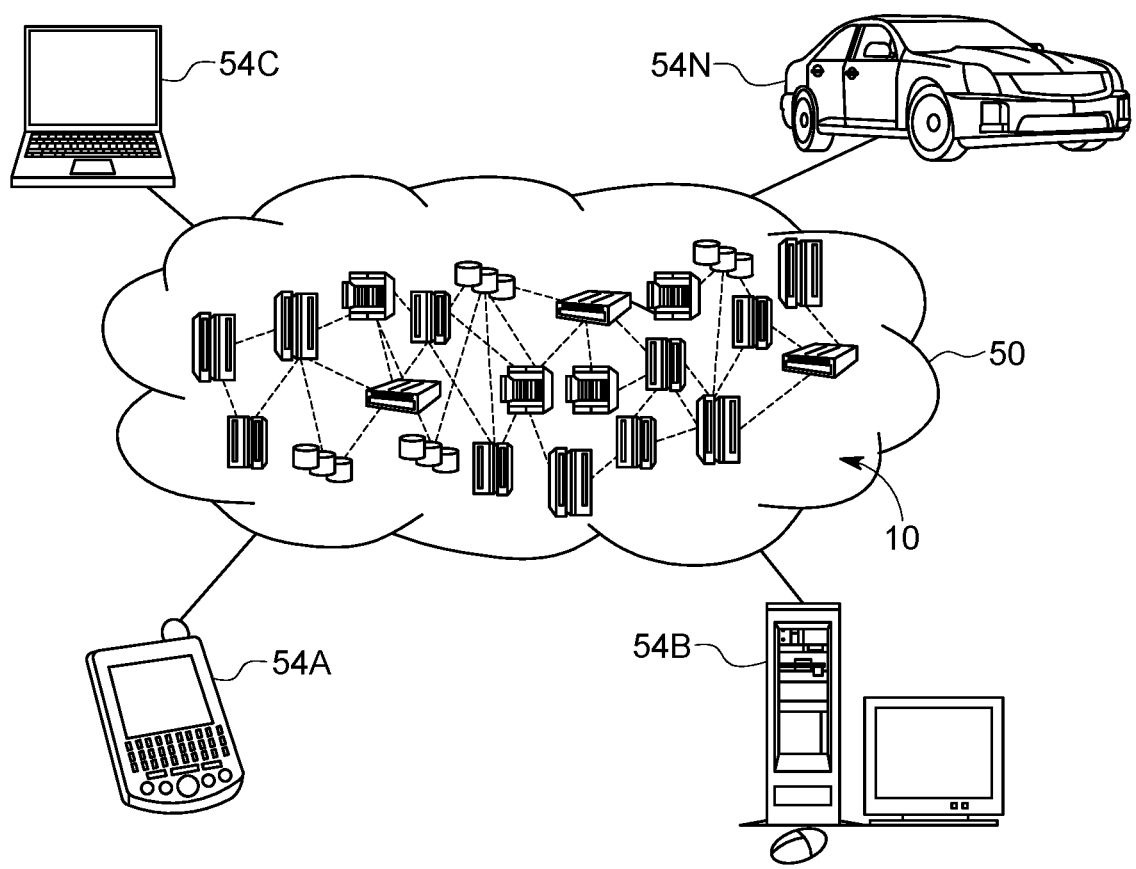
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
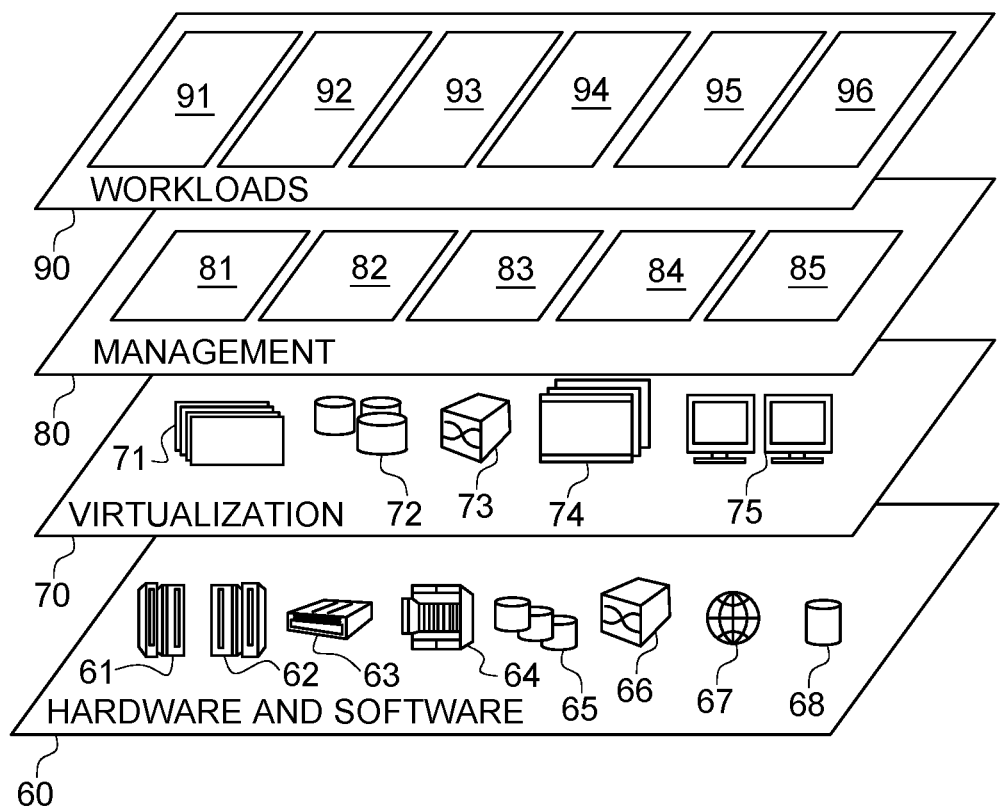
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various RAID computations and functions 96. One of ordinary skill in the art will appreciate that the various RAID computations and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
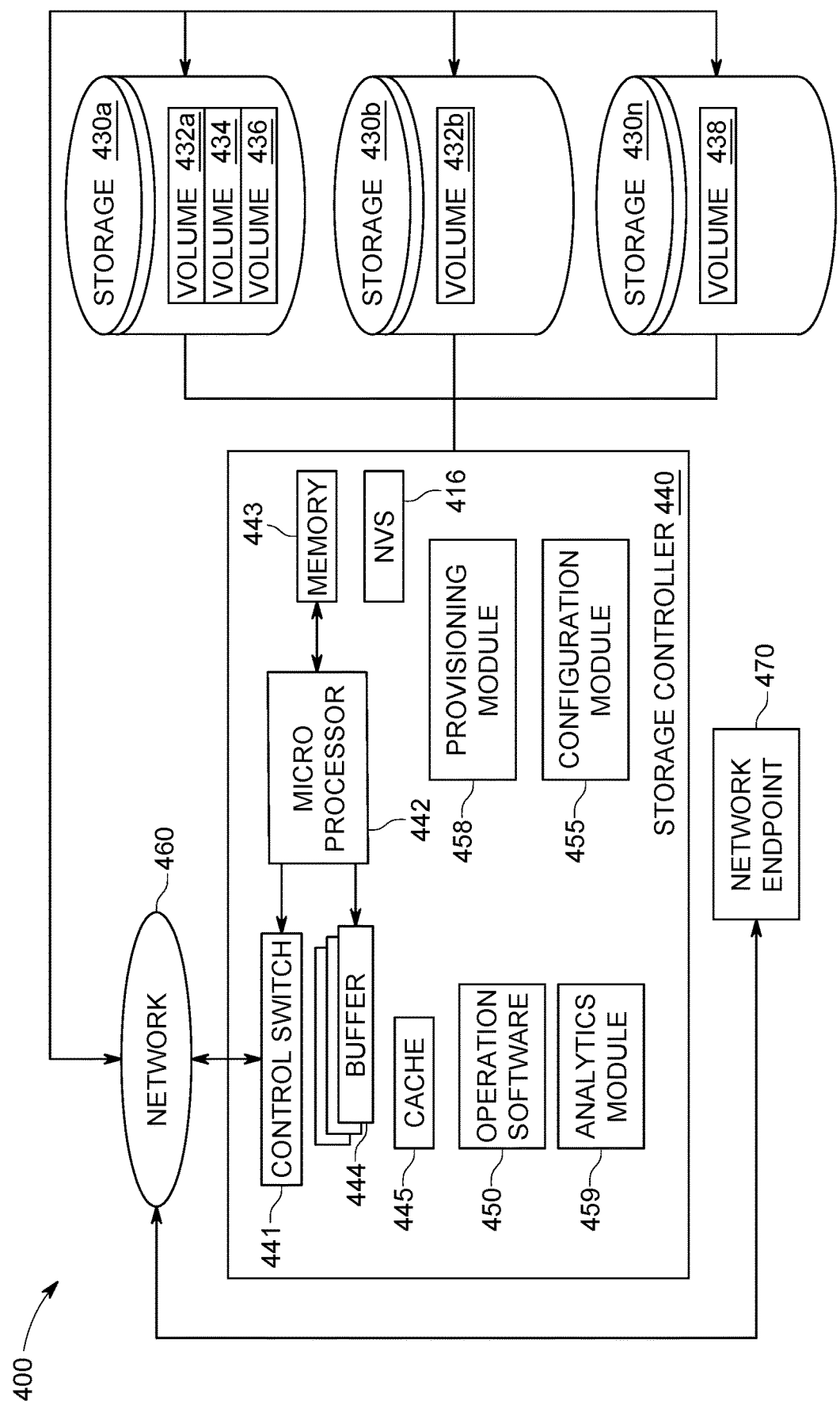
FIG. 4 is an additional block diagram depicting an exemplary hardware structure of a computing storage system in communication with the cloud computing environment, in which aspects of the present invention may be realized.

FIG. 4, following, is an additional block diagram showing a hardware structure of a data management system 400 that may be used in the overall context (i.e., as a portion of a distributed computing environment) of performing functionality according to various aspects of the present invention.

Network 460 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e., the Internet), private, or any combination thereof. The ISP may provide local or distributed data among one or more locations and may be equipped with any type of fabric (or fabric channel) (not shown in FIG. 4) or network adapter 460 to the storage controller 440, such as Fibre channel, FICON, ESCON, Ethernet, fiber optic, wireless, or coaxial adapters. Network management system 400 is accordingly equipped with a suitable fabric (not shown in FIG. 4) or network adaptor 460 to communicate.

To facilitate a clearer understanding of the methods described herein, storage controller 440 is shown in FIG. 4 as a single processing unit, including a microprocessor 442, system memory 443 and nonvolatile storage ("NVS") 416. It is noted that in some embodiments, storage controller 440 is comprised of multiple processing units, each with their own processor complex and system memory, and interconnected by a dedicated network 460 within data storage system 400.

In a local or remote location, yet connected over network 460, storage 430 (labeled as 430a, 430b, and 430n herein) may be comprised of one or more storage devices, such as storage arrays, which are connected to storage controller 440 (e.g., by a storage network) as shown.

In some embodiments, the devices included in storage 430 may be connected in a loop architecture. Storage controller 440 manages storage 430 and facilitates the processing of write and read requests intended for storage 430. The system memory 443 of storage controller 440 stores program instructions and data, which the processor 442 may access for executing functions and method steps of the present invention for executing and managing storage 430 as described herein. In one embodiment, system memory 443 includes, is in association with, or is in communication with the operation software 450 for performing methods and operations described herein. As shown in FIG. 4, system memory 443 may also include or be in communication with a cache 445 for storage 430, also referred to herein as a "cache memory," for buffering "write data" and "read data," which respectively refer to write/read requests and their associated data. In one embodiment, cache 445 is allocated in a device external to system memory 443, yet remains accessible by microprocessor 442 and may serve to provide additional security against data loss, in addition to carrying out the operations as described herein.

In some embodiments, cache 445 is implemented with a volatile memory and non-volatile memory and coupled to microprocessor 442 via a local bus (not shown in FIG. 4) for enhanced performance of data storage system 400. The NVS 416 included in data storage controller 440 is accessible by microprocessor 442 and serves to provide additional support for operations and execution of the present invention as described in other figures. The NVS 416, may also be referred to as a "persistent" cache, or "cache memory" and is implemented with nonvolatile memory that may or may not utilize external power to retain data stored therein. The NVS 416 may be stored in and with the cache 445 for any purposes suited to accomplish the objectives of the present invention. In some embodiments, a backup power source (not shown in FIG. 4), such as a battery, supplies NVS 416 with sufficient power to retain the data stored therein in case of power loss to data storage system 400. In certain embodiments, the capacity of NVS 416 is less than or equal to the total capacity of cache 445.

Storage 430 may be physically comprised of one or more storage devices, such as storage arrays. A storage array is a logical grouping of individual storage devices, such as a hard disk. In certain embodiments, storage 430 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 4 may include a logical volume, or simply "volume," and may have different kinds of allocations. Storage 430a, 430b and 430n are shown as ranks in data storage system 400 and are referred to herein as rank 430a, 430b and 430n. Ranks may be local to data storage system 400, or may be located at a physically remote location. In other words, a local storage controller may connect with a remote storage controller and manage storage at the remote location. Rank 430a is shown configured with two entire volumes, 434 and 436, as well as one partial volume 432a. Rank 430b is shown with another partial volume 432b. Thus volume 432 is allocated across ranks 430a and 430b. Rank 430n is shown as being fully allocated to volume 438—that is, rank 430n refers to the entire physical storage for volume 438. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

A network endpoint 470 is connected through the network 460 as shown. The network endpoint 470 is generically intended to refer to any number of network devices, such as a switch, a router, a wireless access point, or another device known generally to one of ordinary skill in the art. As will be further illustrated in the following figures, a user may use a networked device, (e.g., a device connected to network 460) to access the network 460. The networked device may include computers, tablets, smartphones, television set top boxes, televisions and other video equipment, or even a household appliance such as a refrigerator or a garage door opener, again as one of ordinary skill in the art will appreciate. Ultimately any device having communicative ability to and through network 460 is anticipated to use the network endpoint 470. In one embodiment, the depiction of a network endpoint 470 serves to provide a point where an input object (data object) is introduced into a distributed computing environment, as will be described.

The storage controller 440 may include a configuration module 455 and a provisioning module 458, among other functional components. The configuration module 455 and provisioning module 458 may operate in conjunction with each and every component of the storage controller 440, and storage devices 430. The configuration module 455 and provisioning module 458 may be structurally one complete module or may be associated and/or included with other individual modules. The configuration module 455 and provisioning module 458 may also be located at least partially in the cache 445 or other components, as one of ordinary skill in the art will appreciate.

The configuration module 455 and provisioning module 458 may individually and/or collectively perform various aspects of the present invention as will be further described. For example, the configuration module 455 may perform various system configuration operations in accordance with aspects of the illustrated embodiments, such as configuring the storage controller 440 to operate using a given set of definitional information, for example. The analytics module 459 may use data analytics to compute, identify, organize, create, delete, sequester, or perform other actions on various patterns, trends, and other characteristics identified in the data over the network 460 and between other distributed computing components in a distributed computing environment. As one of ordinary skill in the art will appreciate, the configuration module 455, provisioning module 458, and analytics module 459 may make up only a subset of various functional and/or functionally responsible entities in the data storage system 400.

Other ancillary hardware may be associated with the storage system 400. For example, as shown, the storage controller 440 includes a microprocessor 442 for controlling all functions of the storage controller 440, a nonvolatile control memory 443 for storing a microprogram (operation software) 450 for controlling the operation of storage controller 440, data for control, cache 445 for temporarily storing (buffering) data, and buffers 444 for assisting the cache 445 to read and write data. A control switch 441 may be implemented for controlling a protocol to control data transfer to or from the storage devices 430, the configuration module 455, provisioning module 458, or other blocks of functionality, in which information may be set.

Figure 5A:
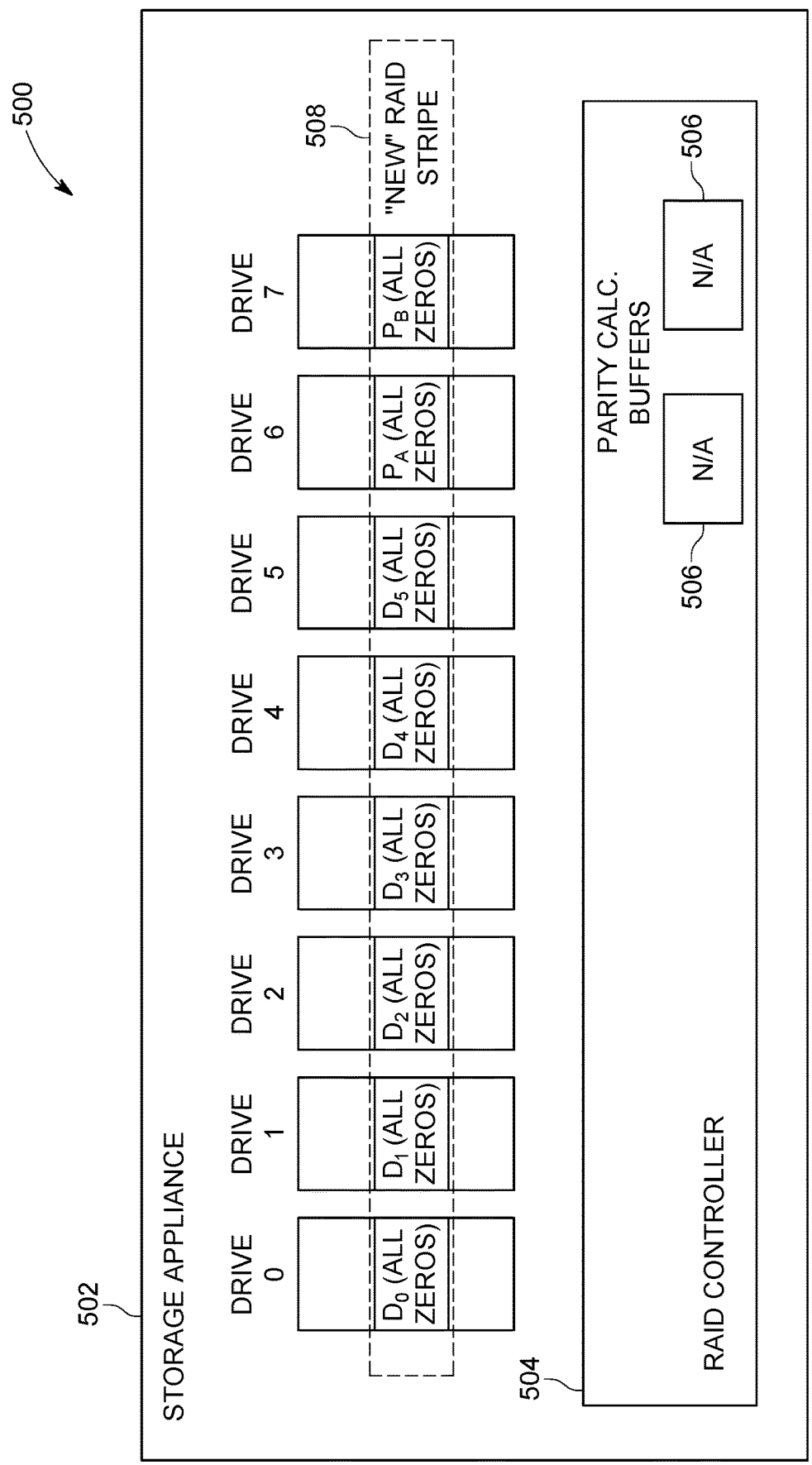
FIG. 5A is a block diagram illustrating a storage appliance having a new RAID stripe, in accordance with aspects of the present invention.
Figure 5B:
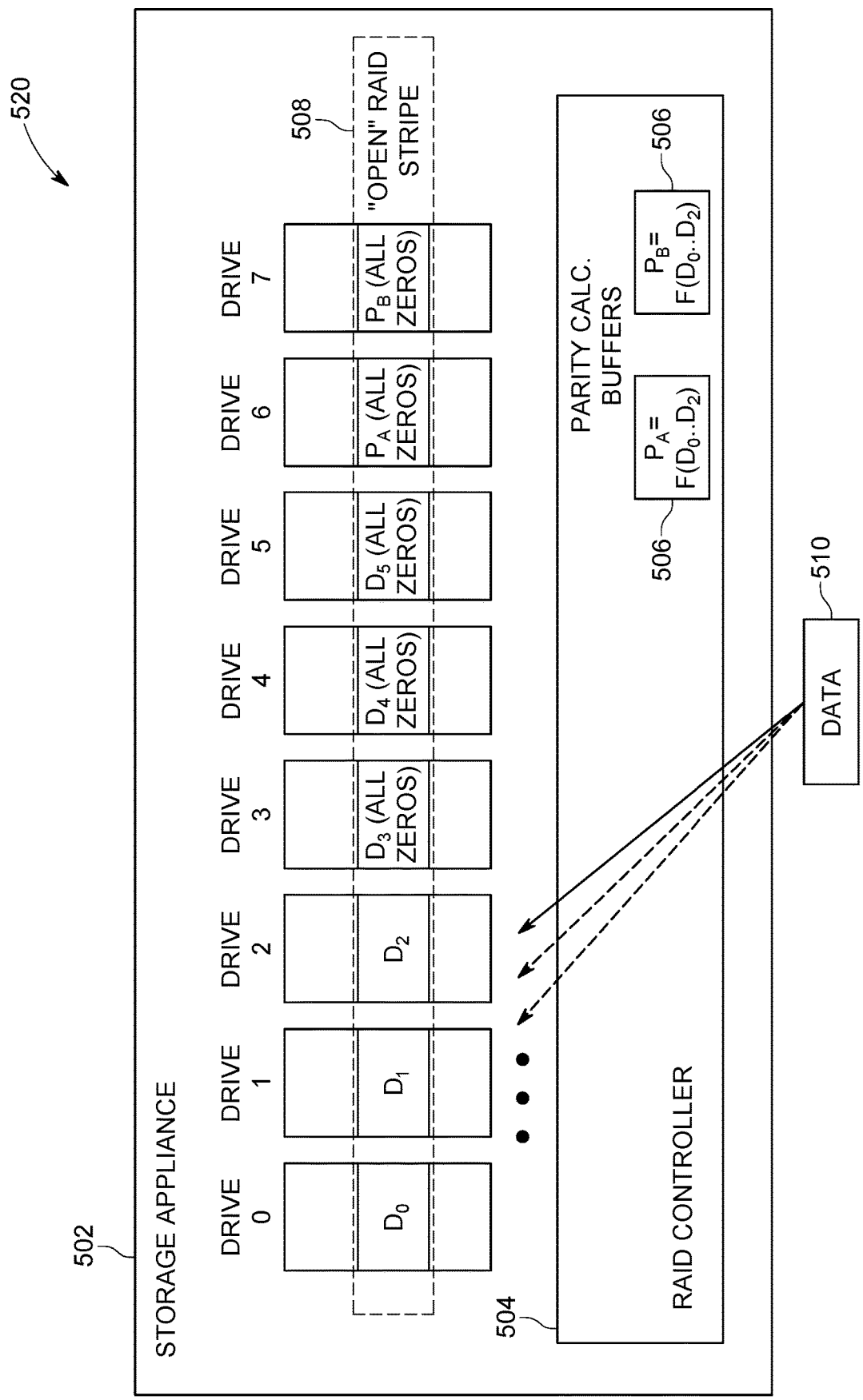
FIG. 5B is a block diagram illustrating a storage appliance writing to the RAID stripe, in accordance with aspects of the present invention.
Figure 5C:
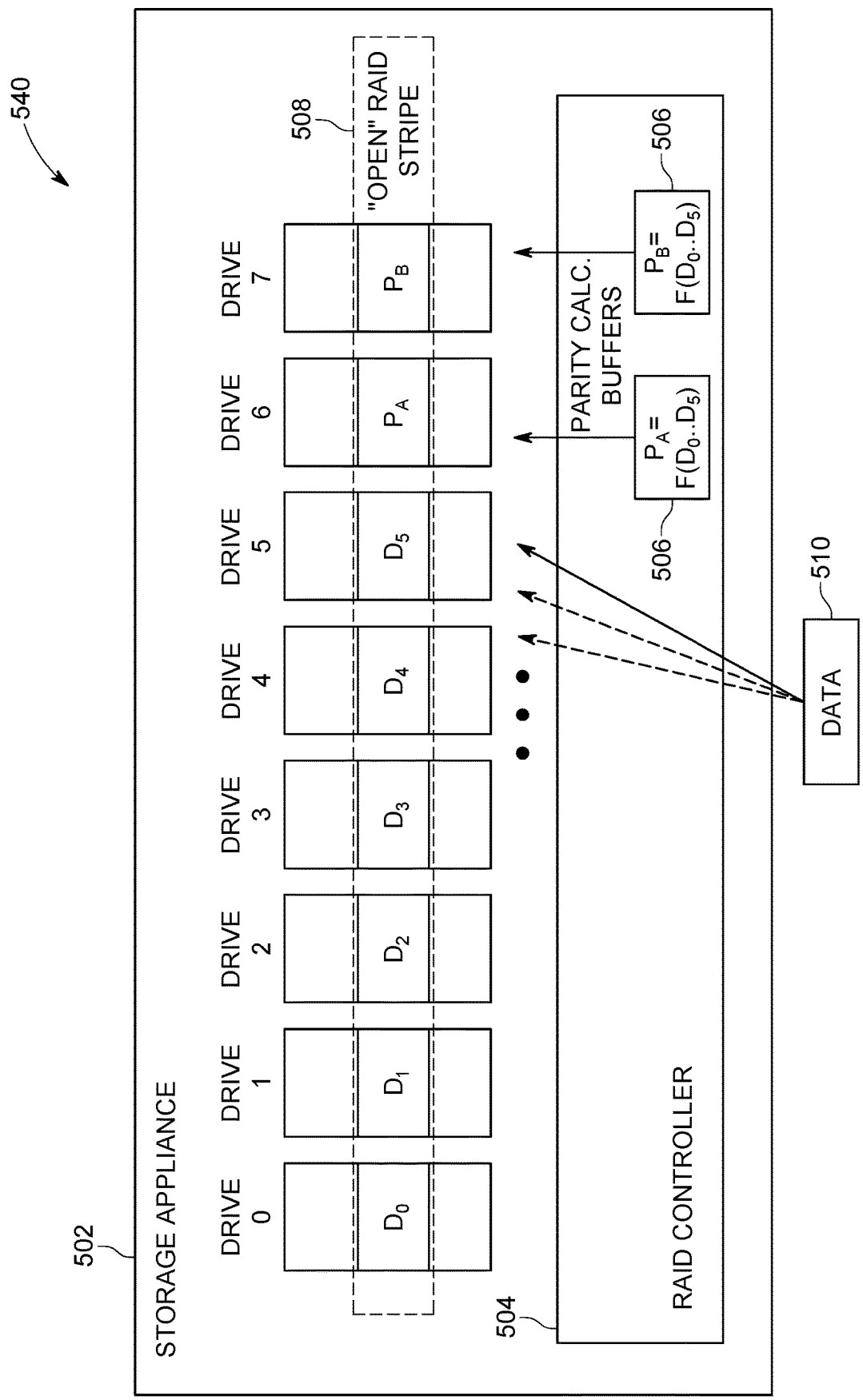
FIG. 5C is a block diagram illustrating a storage appliance completing the RAID stripe, in accordance with aspects of the present invention.

Continuing and to facilitate a clearer understanding of the mechanisms described herein, FIGS. 5A-5C provide block diagrams 500, 520, and 540, respectively, as background context when considering the functionality described hereinbelow. More specifically, block diagrams 500, 520, and 540 illustrate, respectively, the process of initializing, writing to, and completing a RAID stripe within a storage appliance 502. Storage appliance 502 includes a plurality of drives (e.g., disk/hard drives or SSD drives), referenced as drive 0-drive 7, of which a stripe of data 508 is written thereacross. Storage appliance 502 includes a storage controller, which in the context of the present invention comprises a RAID controller 504 having one or more buffer memories (collectively referred to as buffer memory 506) therein. This buffer memory 506 serves to compute parity data associated with the stripe 508, which is ultimately written to one or more of the storage drives.

As shown in diagram 500 of FIG. 5A, in this instance the stripe 508 comprises an unwritten or "new" RAID stripe having unmapped pages on each of the storage drives that the stripe 508 spans. Assuming that unmapped pages are initialized to an all-zero value, and further assuming that the data protection pages (i.e., the parity data) for all-zero pages are themselves all-zero pages, then the parity data (parity pages) for the new RAID stripe is valid from the moment of initialization. The stripe 508 is considered "open", and it will remain open until all data pages and parity pages for the stripe 508 have been written to the storage drives.

Now referring to diagram 520 of FIG. 5B, as data 510 is written to the storage appliance 502, data 510 passes through the RAID controller 504 as it is written to each storage drive, and is used to compute and update the parity data within the buffer memory 506 of the RAID controller 504. In the example shown in diagram 520, three data pages (out of six total) have been written to the stripe 508 (i.e., across drives 0-2), and the stripe 508 remains in the open state. It should be noted that the writes to each RAID stripe progress "monotonically" across the data pages within the stripe 508 meaning that they are in a given incremental order. Subsequent to the depicted three pages of data being written, because the LSA above the storage appliance 502 guarantees full-stripe writes (i.e., each stripe will eventually be filled up in a sequence of one or more monotonic write operations), there is no need yet to unload (evict) the parity data from the buffer memory 506 of the RAID controller 504, however, eventually, the stripe 508 will be completed, at which point the parity data will be evicted. It should further be noted that 1) previously written data is not overwritten until the stripe 508 has been filled (completed), erased, and made ready for reuse; and 2) parity data for an "open" stripe resides within the buffer memory 506 of the RAID controller 504 and not on the storage drives themselves.

Referring last to diagram 540 of FIG. 5C, again as data 510 is written to the storage appliance 502, data 510 passes through the RAID controller 504 as it is written to each storage drive, and is used to compute and update the parity data within the buffer memory 506 of the RAID controller 504. In the example shown in diagram 540, all data pages have been written to the stripe 508 (i.e., all six data pages have been written to drives 0-5, respectively) and the parity pages associated with the full stripe 508 within the buffer memory 506 of the RAID controller 504 are then unloaded (evicted) to the appropriate storage drives. In this instance, the parity drives consist of storage drive 6 and storage drive 7, and once the parity data has been evicted to these storage drives, the "open" stripe 508 is subsequently "closed". It should be noted here that 1) no part of the stripe 508 will be overwritten until the stripe 508 has been filled (completed), erased, and made ready for reuse; and 2) parity data for the "closed" stripe 508 resides completely within the storage drives and has no dependence upon the RAID controller 504.

Several issues exist with the aforementioned technique of generally initializing, writing to, and completing a RAID stripe within a storage appliance 502: (a) There may exist many open stripes being managed by a single RAID controller per volume, per data temperature, per encryption band, etc., and these (open) stripes may remain open stripes for a very lengthy period of time depending on the data writes to a given stripe; (b) Because the stripe is not completed, as noted previously, each of these open stripes bears a "partial" parity calculation that must be held stagnant by the RAID controller or paged into and out of the memory of the RAID controller as the stripe is completed; (c) Parity calculations which are maintained by the RAID controller, and not evicted to the storage drives, are at risk of being lost due to failures or power outages; and (d) It is likely that the RAID controller will maintain some number of partial parity calculations internally, and evict/recall many more partial calculations to and from local memory in a manner analogous to caching. In any case, when performing parity computation and eviction in this way, resources of the storage appliance and RAID controller are not used in an efficient manner as they may become tied-up or bottlenecked due to handling parity data for a multiplicity of incomplete data stripes.

With this context in mind, the present invention improves upon this process by performing one or more cooperative RAID calculations where one or more storage entities performs "partial" RAID parity calculations, which may be offloaded to the other storage entities for reassembly into the complete parity content for a given RAID stripe. That is, when a stripe is left open such that all pages of data have not yet filled the stripe, instead of evicting parity data to local RAID controller memory (and recalling it later once the open stripe is written to), the partial parity calculation is evicted from the RAID controller memory to the appropriate parity drives for the stripe in question. Later, when activity resumes for that stripe, the RAID controller simply generates parity for only the additional data pages that had not yet been "seen" by the RAID controller. This second parity calculation is also a partial parity computation, but covers a different set of lanes within the stripe (only the new data pages currently being written). Because modern storage drives (for example, under an LSA arrangement) support the ability to receive and "assemble" partial parity calculations into a single parity calculation that is valid for all of the lanes included in the partial parities, when the open stripe is eventually completed, the final partial parity page covering only the new data currently being written is evicted to the appropriate drives, which assemble each of the previous partial parity computations (calculated at different times) into the final full-stripe parity result.

Figure 6A:
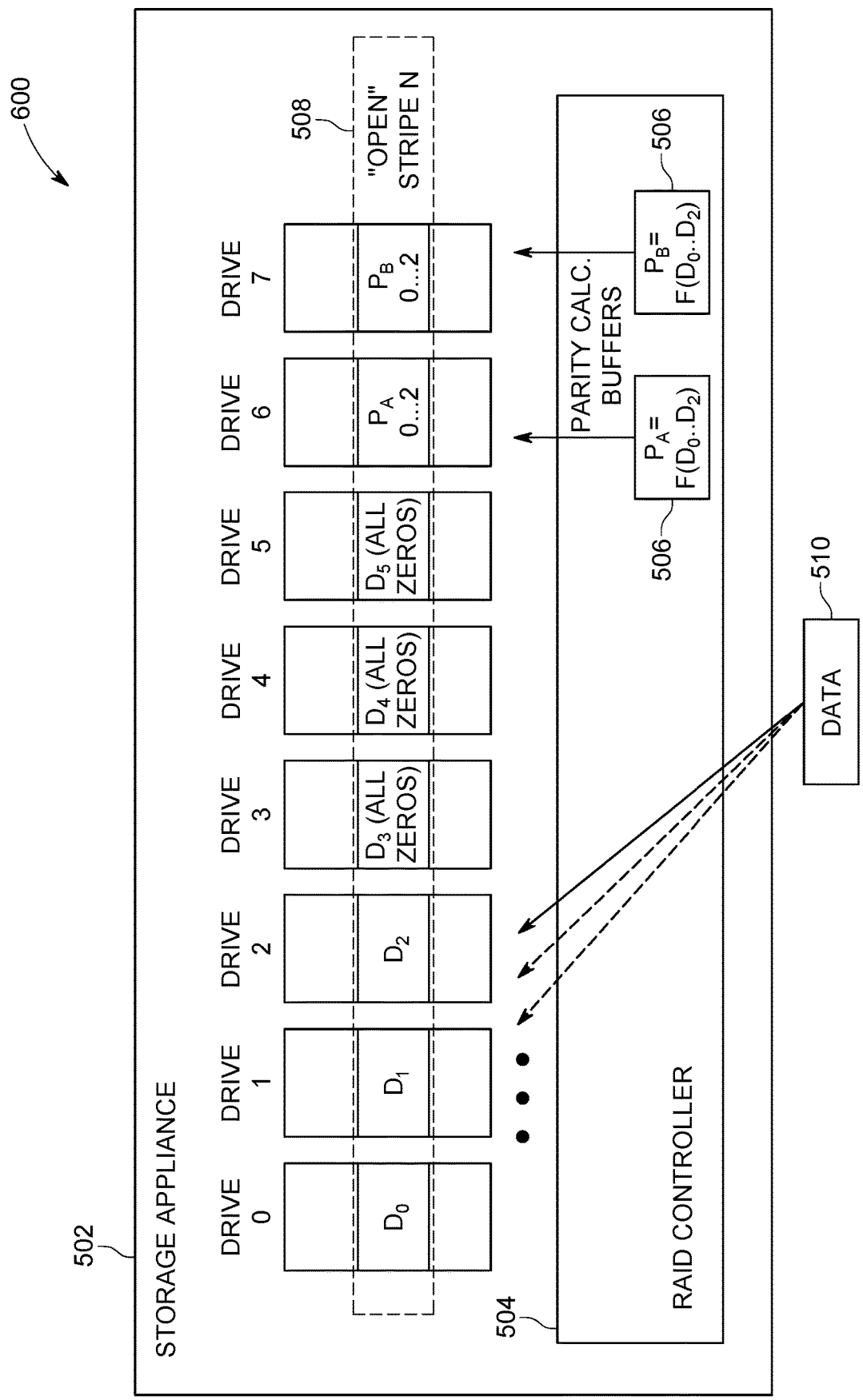
FIG. 6A is a block diagram illustrating a storage appliance evicting first partial parity information of a RAID stripe, in accordance with aspects of the present invention.
Figure 6B:
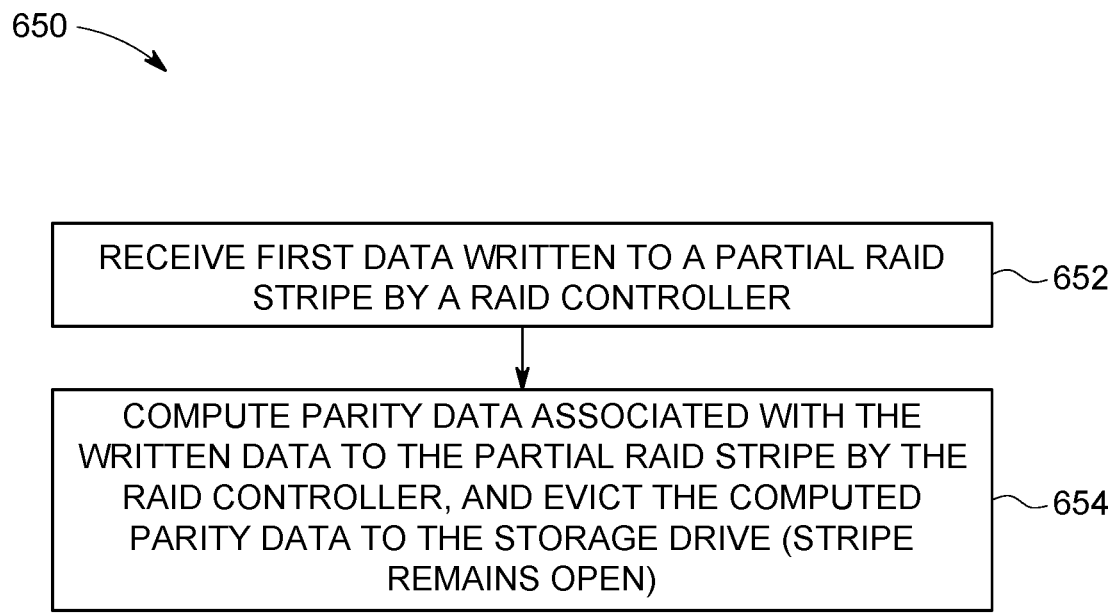
FIG. 6B is a flowchart diagram illustrating an exemplary method for evicting the first partial parity information of the RAID stripe, by which aspects of the present invention may be implemented.

Turning now to FIGS. 6A and 6B, a block diagram 600 illustrating a storage appliance evicting first partial parity information of a RAID stripe is depicted in FIG. 6A. Additionally, a flowchart diagram illustrating an exemplary method 650 for evicting the first partial parity information of the RAID stripe is depicted in FIG. 6B.

The method 650 (and subsequent methods described herein) may be performed in accordance with the present invention in any of the environments depicted in FIGS. 1-4, among others, in various embodiments. Of course, more or fewer operations than those specifically described in FIG. 6B may be included in method 650, as would be understood by one of skill in the art upon reading the present descriptions.

Each of the steps of the method 650 (and subsequent methods described herein) may be performed by any suitable component of the operating environment. For example, in various embodiments, the method 650 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 650. Illustrative processors include, but are not limited to, a central processing unit (CPU), an application specific integrated circuit (ASIC), a field programmable gate array (FPGA), etc., combinations thereof, or any other suitable computing device known in the art.

When considering the storage appliance 502 having the RAID controller 504, the RAID controller 504 is maintaining parity data for open RAID stripe N 508 (open RAID stripe N may be considered to be the same stripe 508 as depicted in FIGS. 5A-5C). The method 650 begins as first data is written to a partial RAID stripe (stripe 508) of the storage drives of the storage appliance 502 by the RAID controller 504 (step 652). At step 654 of the method 650, the following actions may then be performed. The RAID controller computes parity data for this first data written in buffer memory 506. For some reason (which may be described as a "triggering event"), such as due to internal resource limitations, it becomes desirable or perhaps even necessary to evict the current parity data from the buffer memory 506 of the RAID controller 504. In the example depicted in diagram 600, three data pages (out of six total) have been written to the stripe 508 (i.e., written to drives 0 through 2), and the stripe 508 remains in the open state. Where normally the parity data for the three data pages written to drives 0 through 2 would remain stored (or paged out to be recalled subsequently) by local memory within the RAID controller 504, the parity data in diagram 600 is evicted from the buffer memory 506 of the RAID controller 504 to the appropriate storage drives (i.e., storage drives 0 through 2, respectively), and the RAID controller 504 is then free to use its limited resources for computing additional parity data on another stripe. It should be noted that when performing the eviction operation in this manner, the parity protection for the stripe 508 is currently correct and is stored completely on the storage drives 0 through 2, having no dependence on the RAID controller 504.

Figure 7A:
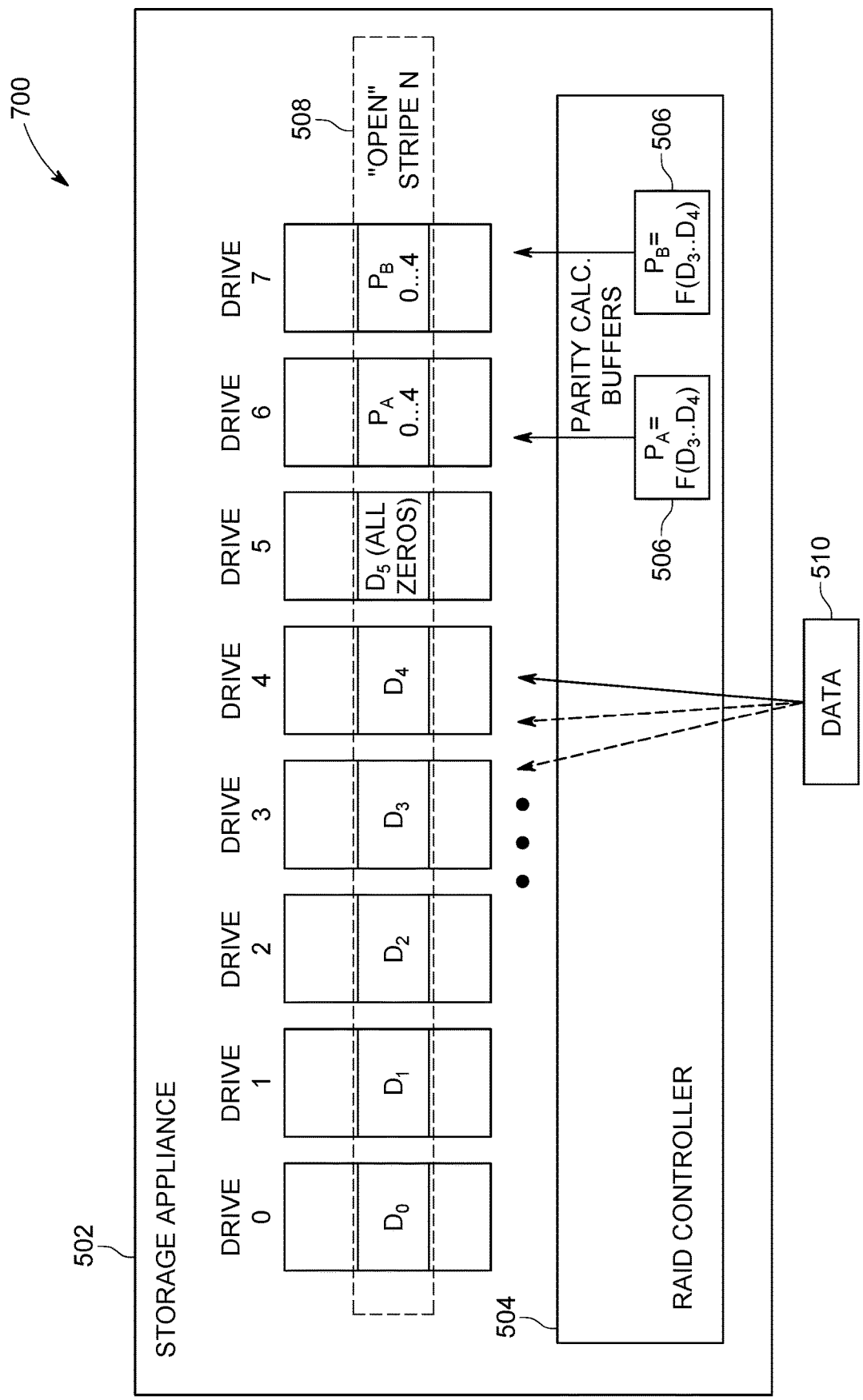
FIG. 7A is a block diagram illustrating a storage appliance evicting second partial parity information of a RAID stripe, in accordance with aspects of the present invention.
Figure 7B:
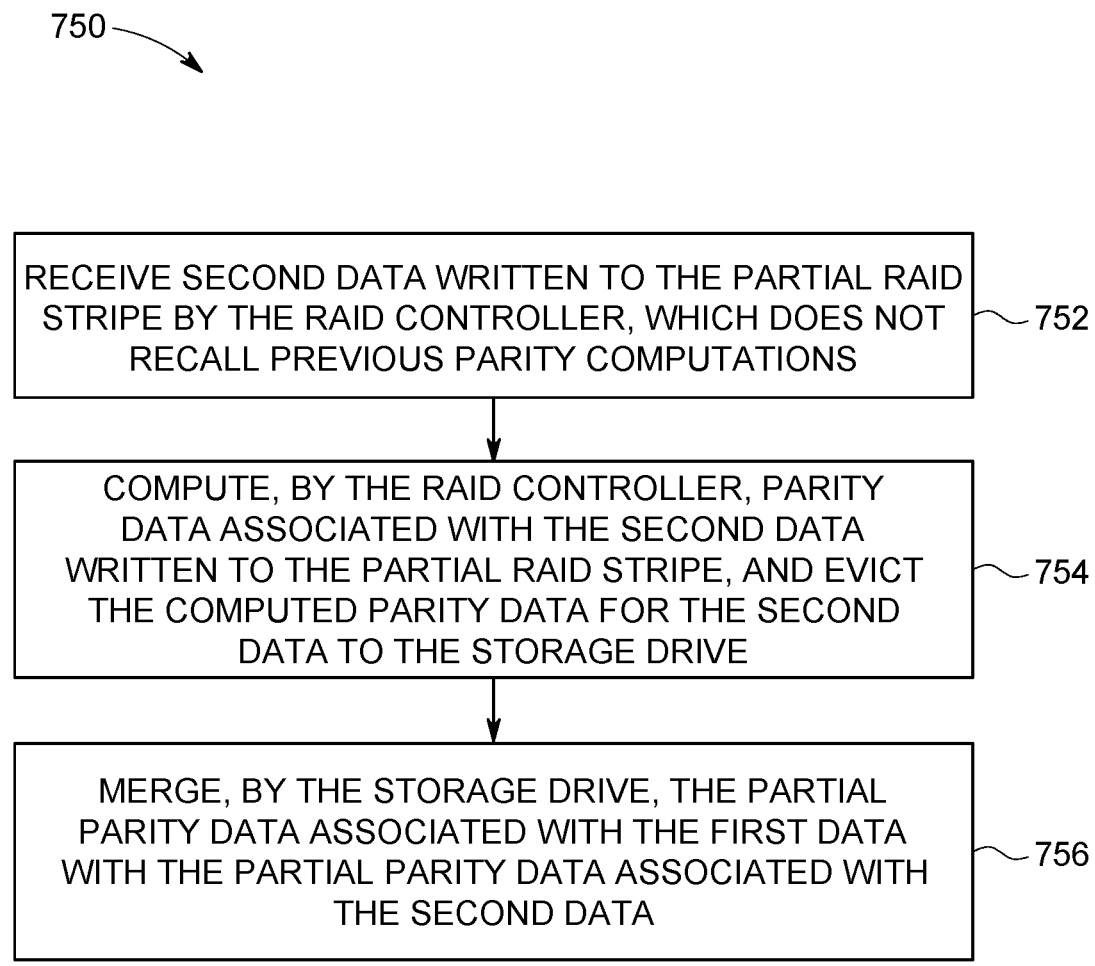
FIG. 7B is a flowchart diagram illustrating an exemplary method for evicting the second partial parity information of the RAID stripe, by which aspects of the present invention may be implemented.

Continuing, FIGS. 7A and 7B then depict a block diagram 700 illustrating a storage appliance evicting second partial parity information of the RAID stripe, and a flowchart diagram illustrating an exemplary method 750 for evicting the second partial parity information of the RAID stripe, respectively.

At some point in the future (i.e., a subsequent time to the time the first data is written and the parity data thereof is evicted to the storage drives from the RAID controller 504), the RAID controller 504 resumes operations on RAID stripe N (stripe 508). That is, and following method 750, second data is written to the stripe 508 (which remains an open, partial RAID stripe) by the RAID controller 504. The RAID controller 504 does not, however, recall its previous parity calculations of the first data, as this parity data associated with the first data has previously been evicted to the parity drives associated with stripe 508 (step 752).

Instead, the RAID controller 504 computes parity data for the newly received data pages (the second data) in the buffer memory 506, which are those data pages received subsequent to its initial parity unload operation of the first data. In this example, two additional data pages (written to storage drives 3-4) have been written to the stripe 508 during this operation, and the stripe 508 remains in the open state. Assume that it again becomes desirable to evict the current parity calculation from the buffer memory 506 for the second data for the stripe 508 (e.g., by determining the "triggering event" has occurred). At step 754, this newly computed partial parity (which depends only upon data pages 3 and 4, or otherwise the latest data pages written to stripe 508) is then evicted from the buffer memory 506 of the RAID controller 504 to the appropriate storage drives of the storage appliance 502. At step 756, the storage drives of the storage appliance 502 merge this new partial parity data of the second data with the previous partial parity data of the first data to generate parity data covering data pages 0 through 4 of the storage drives 0 through 4. In other words, the latest partial parity data associated with the most recent write (the second data) of stripe 508 is merged with the previous parity data associated with the previous write (the first data) to stripe 508 to generate parity data covering each lane (of the first and second data) of the stripe instantly written thereto.

In some embodiments, the "triggering event", which ultimately triggers the eviction of the partial parity data from the RAID controller 504 to the respective storage drives, may comprise a situation where the buffer memory 506 becomes full. At this point (when the buffer memory 506 becomes full), the buffer memory 506 will hold parity for multiple RAID stripes (including stripe 508). Thus, the partial parity data associated with the stripe that the storage appliance 502 deems least likely to receive another write for soon (or some determinate amount of time) may be selected as the first partial parity data to evict, such that the storage drives will be required to perform fewer merging operations. For instance, in some embodiments this stripe (selected for associated partial parity data eviction) may comprise the stripe that has been least recently written to. Of course, other eviction triggers for eviction may exist in other exceptional situations, e.g., when the system is shutting down, etc. as one skilled in the art would appreciate.

Figure 8A:
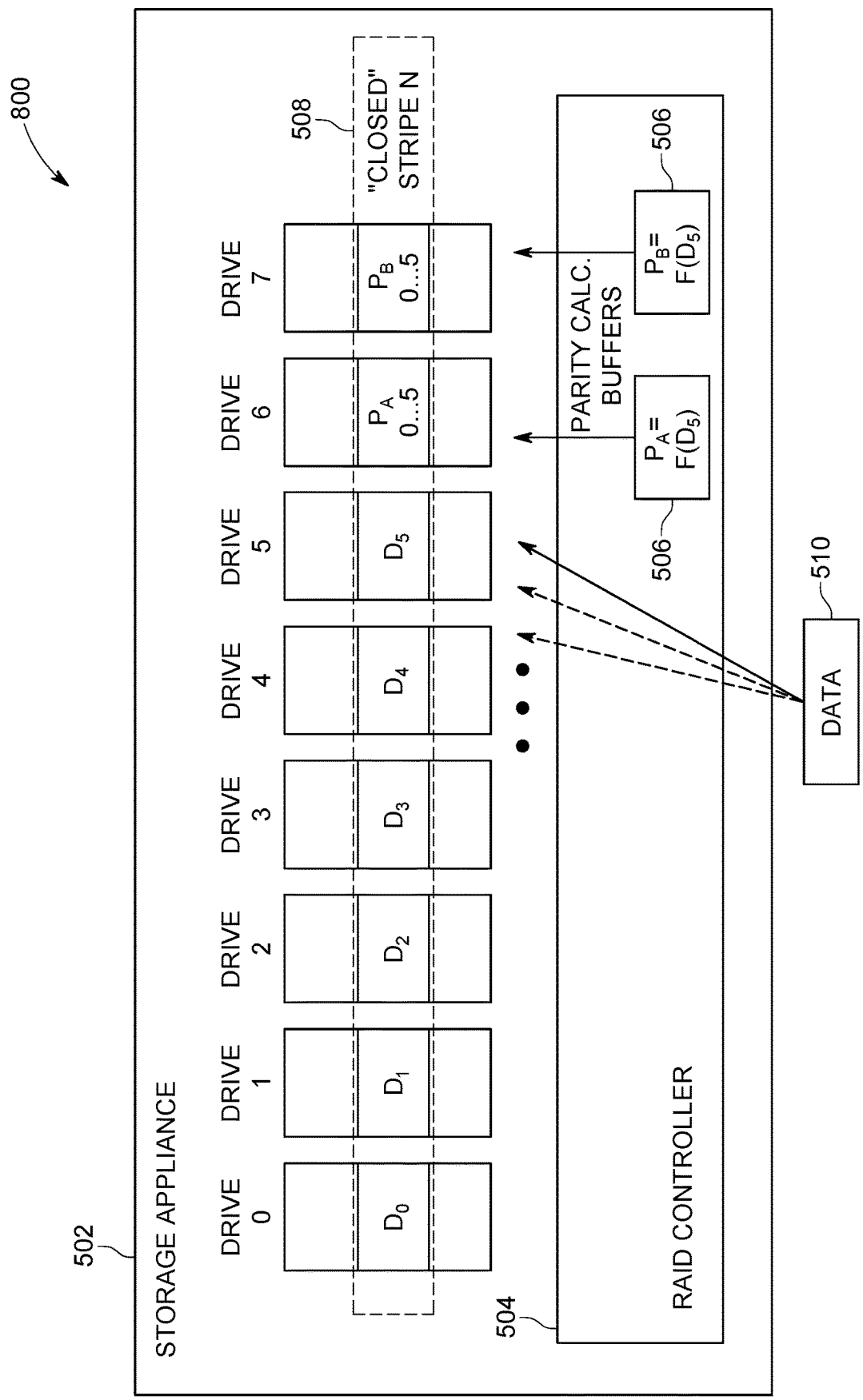
FIG. 8A is a block diagram illustrating a storage appliance evicting third partial parity information, merging the first and the second partial parity information with the third partial parity information, and completing the RAID stripe, in accordance with aspects of the present invention.
Figure 8B:
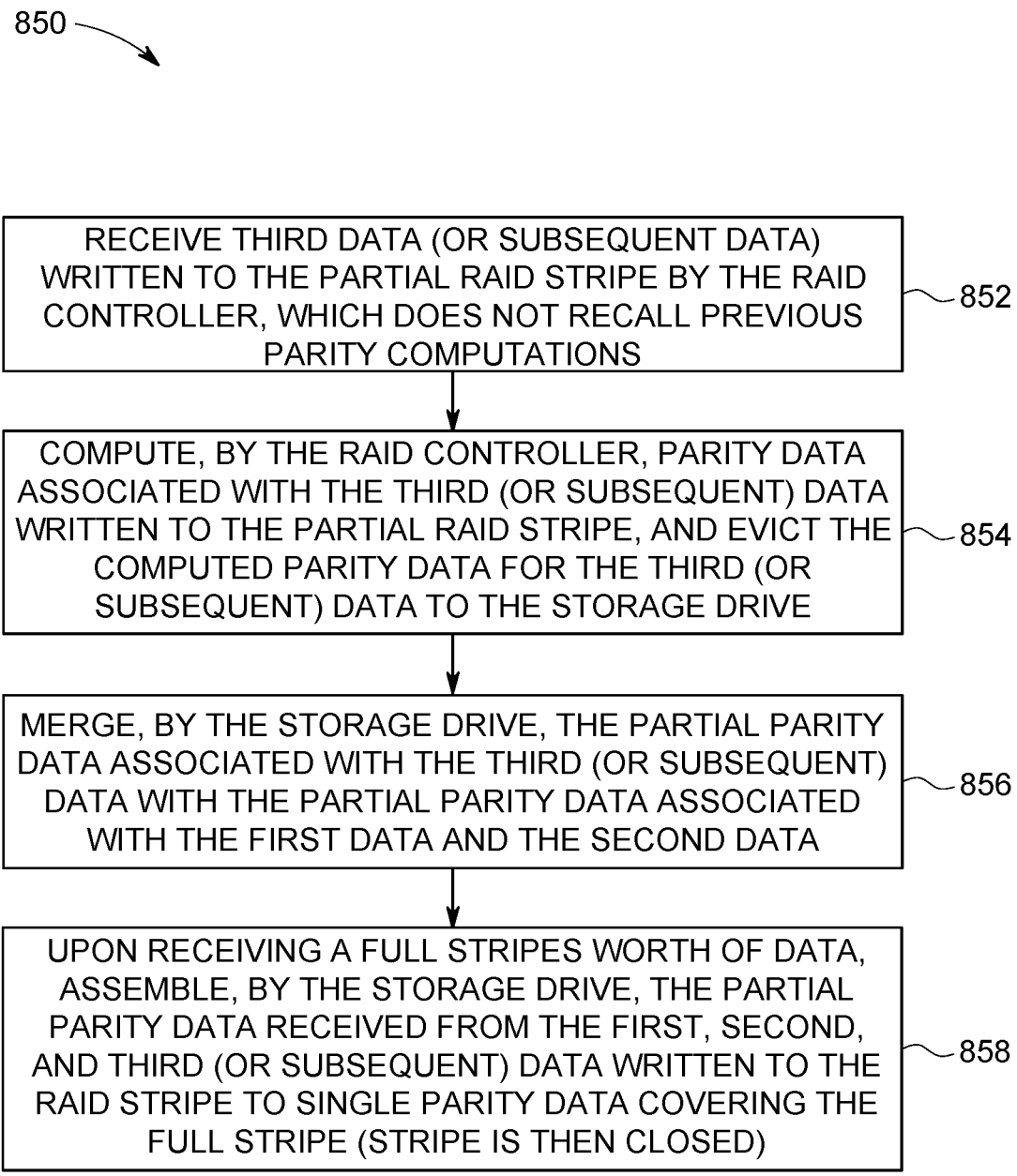
FIG. 8B is a flowchart diagram illustrating an exemplary method for evicting the third partial parity information, merging the first and the second partial parity information with the third partial parity information, and completing the RAID stripe, by which aspects of the present invention may be implemented.

Advancing, FIGS. 8A and 8B depict a block diagram 800 illustrating a storage appliance evicting third partial parity information, merging the first and the second partial parity information with the third partial parity information, and completing the RAID. Additionally, FIG. 8B depicts a flowchart diagram illustrating an exemplary method 850 for performing the pursuant operation.

Again, at some point in the future (i.e., a subsequent time to the time the first and second data is written and the parity data thereof is evicted to the storage drives from the RAID controller 504), the RAID controller 504 resumes operations on RAID stripe N (stripe 508). That is, and following method 850, third (or subsequent) data is received and written to the stripe 508 (which remains an open, partial RAID stripe) by the RAID controller 504. The RAID controller 504 does not, however, recall its previous parity calculations of the first data and the second data, as this parity data associated with the first and second data has previously been evicted to the parity drives associated with stripe 508 (step 852).

Instead, the RAID controller 504 computes parity data for the newly received data pages (the third or subsequent data) in the buffer memory 506, which are those data pages received subsequent to its initial parity unload operation of the first and second data. In this example, one additional data page (written to storage drive 5) has been written to the stripe 508 during this operation, and the stripe 508 is then "complete" yet remains in an open state. Since the stripe 508 is now complete, parity data (depending only upon data page D5 at drive 5) is computed at step 854 and evicted from the buffer memory 506 of the RAID controller 504 to the appropriate storage drives. At step 856, the storage drives of the storage appliance 502 merge this new partial parity data of the third data with the previous partial parity data of the first and second data to generate complete parity data which covers all pages in stripe 508. In other words, and at step 858, upon completing stripe 508 such that stripe 508 is a full stripe of data, the latest partial parity data associated with the most recent write of stripe 508 (the third or subsequent data) is merged with the previous parity data associated with the previous write to stripe 508 (the first and second data) to generate parity data covering each lane of the stripe instantly written thereto. The stripe 508 is then closed.

Figure 9:
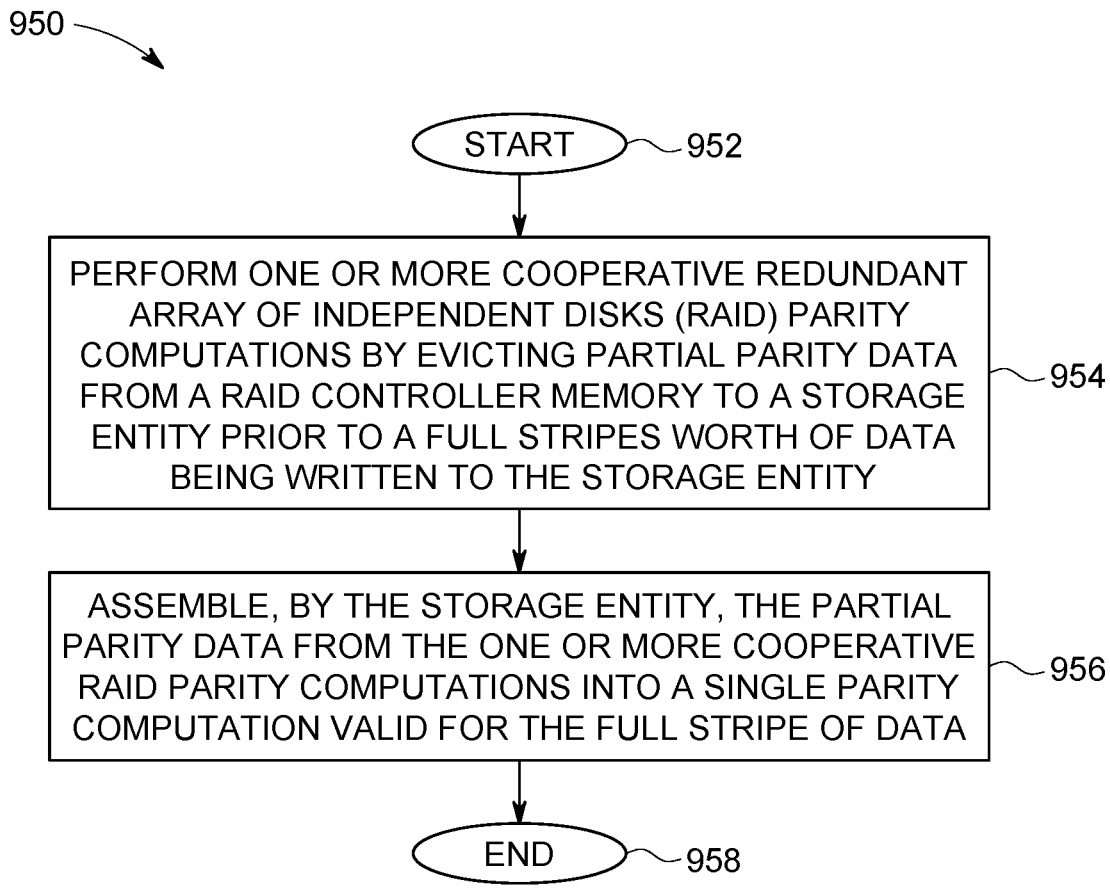
FIG. 9 is a flowchart diagram illustrating an exemplary method for optimizing resource consumption in a storage system of a data storage environment, by which aspects of the present invention may be implemented.

Reviewing these concepts, FIG. 9 is a flowchart diagram illustrating an exemplary method 950 for optimizing resource consumption in a storage system of a data storage environment, by which aspects of the present invention may be implemented.

The method 950 begins (step 952) by performing one or more cooperative RAID parity computations by evicting partial parity data from a RAID controller memory to a storage entity prior to a full stripes worth of data being monotonically written to the storage entity (step 954). The storage entity (or entities) assemble the partial parity data from the one or more cooperative RAID parity computations into a single parity computation valid for the full stripe of data, thereby offloading parity computation to the storage entity to more efficiently utilize the RAID controller memory resources (step 956). The method 950 ends (step 958).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for optimizing resource consumption in a storage system of a data storage environment, by a processor, comprising:
    performing one or more cooperative Redundant Array of Independent Disks (RAID) parity computations by evicting partial parity data from a RAID controller memory to a storage entity prior to a full stripes worth of data being monotonically written to the storage entity; and
    assembling, by the storage entity, the partial parity data from the one or more cooperative RAID parity computations into a single parity computation valid for the full stripe of data, thereby offloading parity computation to the storage entity to more efficiently utilize the RAID controller memory resources.

2. The method of claim 1, further including receiving first data written to a first set of lanes comprising a partial stripe of data; and
    computing the parity data associated with the first data, and evicting the parity data computed from the first data from the RAID controller memory to the storage entity at a first time.

3. The method of claim 2, further including receiving second data written to a second set of lanes within the partial stripe of data; and
    computing the parity data associated with the second data, and evicting the parity data computed from the second data from the RAID controller memory to the storage entity at a second time.

4. The method of claim 3, further including merging the parity data associated with the first data and the parity data associated with the second data by the storage entity subsequent to the eviction of the second data.

5. The method of claim 3, wherein the parity data is evicted from the RAID controller memory to the storage entity upon the RAID controller memory becoming full.

6. The method of claim 1, further including, upon receiving the full stripes worth of data, performing the assembling, by the storage entity, of the partial parity data from the first data and the second data into the single parity computation valid for the full stripe of data.

7. The method of claim 1, wherein the storage system is a log-structured array (LSA) storage system and the storage entity comprises at least one of a hard disk and a solid state drive (SSD).

8. A system for optimizing resource consumption in a storage system of a data storage environment, the system comprising:
    a Redundant Array of Independent Disks (RAID) controller having a memory;
    a storage entity; and
    a processor in communication with the RAID controller and the storage entity, wherein the processor:
        performs one or more cooperative RAID parity computations by evicting partial parity data from the RAID controller memory to the storage entity prior to a full stripes worth of data being monotonically written to the storage entity; wherein the storage entity assembles the partial parity data from the one or more cooperative RAID parity computations into a single parity computation valid for the full stripe of data, thereby offloading parity computation to the storage entity to more efficiently utilize the RAID controller memory resources.

9. The system of claim 8, wherein the processor receives first data written to a first set of lanes comprising a partial stripe of data; and
    computes the parity data associated with the first data, and evicts the parity data computed from the first data from the RAID controller memory to the storage entity at a first time.

10. The system of claim 9, wherein the processor receives second data written to a second set of lanes within the partial stripe of data; and
    computes the parity data associated with the second data, and evicts the parity data computed from the second data from the RAID controller memory to the storage entity at a second time.

11. The system of claim 10, wherein the processor merges the parity data associated with the first data and the parity data associated with the second data by the storage entity subsequent to the eviction of the second data.

12. The system of claim 10, wherein the parity data is evicted from the RAID controller memory to the storage entity upon the RAID controller memory becoming full.

13. The system of claim 8, wherein the processor, upon receiving the full stripes worth of data, performs the assembling, by the storage entity, of the partial parity data from the first data and the second data into the single parity computation valid for the full stripe of data.

14. The system of claim 8, wherein the storage system is a log-structured array (LSA) storage system and the storage entity comprises at least one of a hard disk and a solid state drive (SSD).

15. A computer program product for optimizing resource consumption in a storage system of a data storage environment, by a processor, the computer program product embodied on a non-transitory computer-readable storage medium having computer-readable program code portions stored therein, the computer-readable program code portions comprising:

an executable portion that performs one or more cooperative Redundant Array of Independent Disks (RAID) parity computations by evicting partial parity data from a RAID controller memory to a storage entity prior to a full stripes worth of data being monotonically written to the storage entity; and an executable portion that assembles, by the storage entity, the partial parity data from the one or more cooperative RAID parity computations into a single parity computation valid for the full stripe of data, thereby offloading parity computation to the storage entity to more efficiently utilize the RAID controller memory resources.

16. The computer program product of claim 15, further including an executable portion that receives first data written to a first set of lanes comprising a partial stripe of data; and an executable portion that computes the parity data associated with the first data, and evicts the parity data computed from the first data from the RAID controller memory to the storage entity at a first time.

17. The computer program product of claim 16, further including an executable portion that receives second data written to a second set of lanes within the partial stripe of data; and an executable portion that computes the parity data associated with the second data, and evicts the parity data computed from the second data from the RAID controller memory to the storage entity at a second time.

18. The computer program product of claim 17, further including an executable portion that merges the parity data associated with the first data and the parity data associated with the second data by the storage entity subsequent to the eviction of the second data.

19. The computer program product of claim 17, wherein the parity data is evicted from the RAID controller memory to the storage entity upon the RAID controller memory becoming full.

20. The computer program product of claim 15, further including an executable portion that, upon receiving the full stripes worth of data, performs the assembling, by the storage entity, of the partial parity data from the first data and the second data into the single parity computation valid for the full stripe of data.

21. The computer program product of claim 15, wherein the storage system is a log-structured array (LSA) storage system and the storage entity comprises at least one of a hard disk and a solid state drive (SSD).

\* \* \* \* \*